US006931056B2

(12) United States Patent
Goodings

(10) Patent No.: US 6,931,056 B2
(45) Date of Patent: Aug. 16, 2005

(54) METHOD AND APPARATUS FOR CODE PHASE TRACKING

(75) Inventor: Christopher J. Goodings, Fleet (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 785 days.

(21) Appl. No.: 09/854,402

(22) Filed: May 11, 2001

(65) Prior Publication Data

US 2001/0055330 A1 Dec. 27, 2001

(30) Foreign Application Priority Data

May 13, 2000 (GB) .............................................. 0011493

(51) Int. Cl.[7] .................................................. H04B 1/69
(52) U.S. Cl. ..................................... 375/150; 375/149
(58) Field of Search ................................. 375/149, 150, 375/206, 350, 371; 342/357, 357.1

(56) References Cited

U.S. PATENT DOCUMENTS

| | | | | |
|---|---|---|---|---|
| 5,493,588 A | * | 2/1996 | Lennen ...................... 375/343 |
| 5,640,416 A | * | 6/1997 | Chalmers .................... 375/147 |
| 5,805,108 A | * | 9/1998 | Lennen .................. 342/357.12 |
| 5,854,815 A | * | 12/1998 | Lennen ...................... 375/343 |
| 6,160,841 A | * | 12/2000 | Stansell et al. ............. 375/148 |
| 6,163,567 A | * | 12/2000 | Hatch ......................... 375/149 |
| 6,658,048 B1 | * | 12/2003 | Valio ........................... 375/150 |

OTHER PUBLICATIONS

"Extended Tracking Range Delay–Locked Loop", by Andreas Wilde, German Aerospace Research Establishment , 1995, pp. 1051–1054.

* cited by examiner

*Primary Examiner*—Jay K. Patel
*Assistant Examiner*—Jacob Meek
(74) *Attorney, Agent, or Firm*—Aaron Waxler

(57) ABSTRACT

A method of code phase tracking for CDMA type communication is disclosed together with apparatus including a GPS receiver (10 to 15) for the same. The method uses a modified early-minus-late correlation function to determine the code phase error between a target pseudorandom noise code of an incoming signal and locally generated replica codes. The early-minus-late correlation function is modified compared to the true function whereby the gradient of the modified function at zero code phase error is increased. This may be achieved my modifying the early-minus-late correlation function after its derivation. Alternatively, it may be modified by modifying variables from which it is derived and in particular, by modifying the either or both of the power spectrums of the subject signal or the early and late replica code signals whereby at least one odd harmonic is reduced in size or removed; at least one even harmonic is increased in size: or the bandwidth is truncating between harmonics so as to excise an adjacent even harmonic.

17 Claims, 3 Drawing Sheets

METHOD AND APPARATUS FOR CODE PHASE TRACKING

This invention relates to a method of code phase tracking for code division multiple access (CDMA) type communication and to apparatus for the same.

The invention is of particular benefit to the field of global positioning systems (GPS) and is described with reference to GPS hereafter. However, such reference should not be interpreted as limiting the scope of the invention to merely GPS, For example, the invention is equally applicable to CDMA communication between mobile cellular telephones and associated networks.

At present, GPS is most notably associated with the Navigation System with Time and Ranging (NAVSTAR) GPS, an all weather, spaced based navigation system developed and operated by the US Department of Defense, however, the general principles underlying GPS are universal and not merely limited to NAVSTAR. Accordingly, GPS hereafter refers to any global positioning system comprising a plurality of CDMA radio transmitters at different locations and a receiver which determines its location based on the time of arrival of the transmissions of the radio transmitters.

As is well known, a GPS receiver may implement a pseudorandom noise (PRN) code correlation loop in which early (E), prompt (P) and late (L) replica codes of satellite PRN codes are continuously generated, and compared to the incoming satellite PRN codes as received by the receiver. Using a code phase discriminator calculated as a function of the correlation, it is then possible to determine whether a target incoming code has been acquired; if the code phase discriminator exceeds a predetermined threshold level, the target incoming code and the locally generated replica codes can be assumed to be in phase, i.e. the code is acquired. If not, the code generator produces the next series of replicas with a phase shift, typically of one chip, and the code phase discriminator is recalculated. Assuming carrier phase lock, a linear code sweep should eventually result in the target incoming code being in phase with that of the locally generated replica codes and therefore, if detected, code acquisition.

Once the code is acquired, a code phase lock loop may be used to track the code, typically employing an early-minus-late code correlation function in order to determine the code phase error between the target incoming code and the locally generated replica codes. As code phase shift is the basis for pseudorange measurements, the accuracy to which the pseudoranges can be measured and ultimately to which the position of the GPS receiver can be estimated depends on the accuracy to which the code phase lock loop can determine the code phase error.

It is therefore an object of the invention to provide a method and apparatus for code phase tracking able to more accurately determine the code phase error between a target pseudorandom noise code of an incoming signal and locally generated replica codes.

According to the present invention, a method of code phase tracking is provided together with a receiver comprising an antenna and a signal processor for the same. The method comprises the steps of:

(a) receiving a subject signal containing a target pseudorandom noise code;

(b) generating a series of signals containing early and late replica codes corresponding to the target code;

(c) correlating the subject signal with the early and late replica code signals and returning respective early and late correlation values; and (d) determining the code phase error between the target code and the replica codes from a modified early-minus-late correlation function derived from the early and late correlation values, the modified early-minus-late correlation function being such that its gradient at zero code phase error is increased compared to the true early-minus-late correlation function.

Increasing the gradient of the early-minus-late correlation function at the zero code phase error enables the occurrence of zero code phase error to be determined more accurately.

The early-minus-late correlation function may be modified after its derivation or, alternatively, prior to its derivation by modifying either the subject signal, the early and late replica code signals or the early and late correlation values.

Modifying any one of the parameters from which the early-minus-late correlation function is derived may enable the necessary signal processing to be simplified. For example, modification of the subject signal may be achieved using relatively simple front-end analogue circuitry and modification of the early and late replica code signals may be achieved either by processing unmodified replica signals, say by filtering, or by direct generation of the appropriate sequence, especially if done in the digital domain.

Modification of the subject signal and/or the early and late replica code signals preferably including modification of their respective power spectrums by at least one of the following: reducing in size or removing at least one odd harmonic; increasing in size at least one even harmonic; and truncating the bandwidth between harmonics so as to excise an adjacent even harmonic.

There is believed there is a direct relationship between the power spectrums of the subject signal/replica signals and the early-minus-late correlation function such that the aforementioned harmonic manipulation increases the gradient of the early-minus-late correlation function at the point of zero code phase error. This relationship together with its effect on the accuracy to which the occurrence of zero code phase error can be determined is explained below.

The invention further provides a receiver comprising a signal processor for modifying the power spectrum of a received subject signal containing a target pseudorandom noise code whereby the power spectrum of the subject signal has either at least one odd harmonic which is reduced in size or removed; at least one even harmonic which is increased in size; or a reduced bandwidth which is truncated between harmonics so as to excise an adjacent even harmonic.

The invention yet further provides a receiver comprising an antenna for receiving a subject signal containing a target pseudorandom noise code; and a signal processor comprising a generator for generating a series of signals containing early and late replica codes corresponding to the target code, a correlator for correlating the subject signal with the early and late replica code signals and returning respective early and late correlation values, and means for determining the code phase error between the target code and the replica codes from a modified early-minus-late correlation function derived from the early and late correlation values, such that the gradient of the modified early-minus-late correlation function at zero code phase error is increased compared to the true early-minus-late correlation function.

The above receiver may modify the early-minus-late correlation function by modifying either the subject signal, the early and late replica code signals or the early and late correlation values prior to deriving the early-minus-late correlation function. In particular, but not exclusively, the receiver may modify the early-minus-late correlation function by modifying the subject signal or the early and late replica code signals whereby either or both of their respective power spectrums have either at least one odd harmonic which is reduced in size or removed; at least one even harmonic which is increased in size; or a reduced bandwidth which is truncated between harmonics so as to excise an adjacent even harmonic.

The above and other features and advantages of the present invention will be apparent from the following description, by way of example, of an embodiment of a method of code phase tracking and a GPS receiver according to the present invention with reference to the accompanying drawings in which.

The general principles underlying GPS and methods and apparatus for its implementation are known. For example, see GPS Principles and Applications (Editor, Kaplan) ISBN 0-89006-793-7 Artech House, hereinafter "Kaplan".

As is well known, each NAVSTAR GPS satellite transmits two carrier frequencies; L1, the primary frequency at 1575.42 MHz and L2, the secondary frequency at 1227.60 MHz. The cattier frequencies are modulated by spread spectrum codes with a PRN sequence unique to cach satellite and also by the navigation data message. The L1 signal is modulated by the coarse/acquisition (C/A) code and the precision (P[Y]) code whereas the L2 signal is modulated by the P[Y] code only. The P[Y] codes relate to the precise positioning service (PPS) primarily for military and select government agency users Whereas the C/A relates to the standard positioning service (SPS) for which there is currently unrestricted access.

Figure 1:
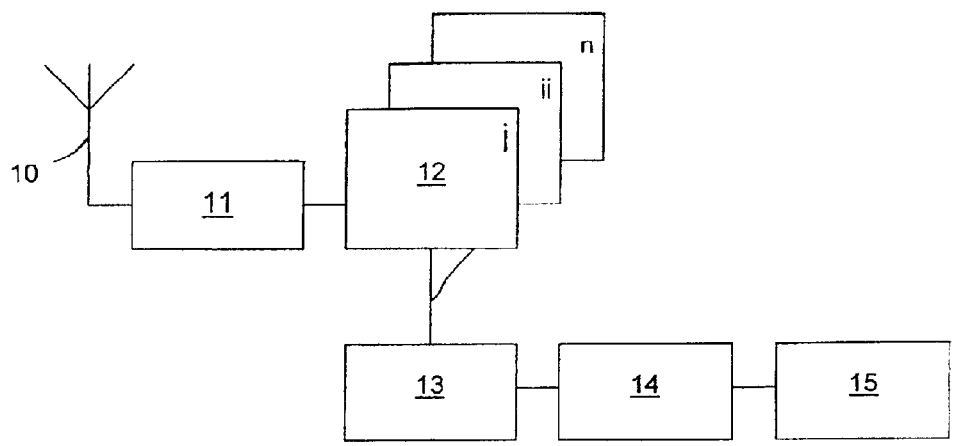
FIG. 1 shows, schematically, an SPS GPS receiver according to the present invention.

FIG. 1 shows, schematically, the architecture of an SPS GPS receiver according to the present invention. GPS radio frequency (RF) signals are received by an antenna 10 and pre-processed in a pre-processor 11 by preamplification, passive bandpass filtering in order to minimise out-of-band RF interference, further filtering to filter out first harmonics of the power spectrum of the incoming signal; down converting to an intermediate frequency (IF) and analog to digital conversion. Digitised IF signals are then provided to each of n digital receiver channels 12 in which they are acquired and tracked in co-operation with the receiver processor 13 for the purpose of acquiring navigation information. Such methods for acquisition and tracking are well known, for example, see chapter 4 (GPS satellite signal characteristics) & chapter 5 (GPS satellite signal acquisition and tracking), Kaplan ibid. Using acquired navigation information and the time of arrival of the transmissions, the navigation processor 14 calculates the position of the receiver using conventional algorithms and that position is displayed on a display 15 to the user.

The pre-processor 11 will be typically implemented in the form of front end analogue circuitry with the digital receiver channels 12, the receiver processor 13 and the navigation processor 14 implemented in the form of a general purpose microprocessor or a microprocessor embedded in a GPS application specific integrated circuit (ASIC).

Figure 2:
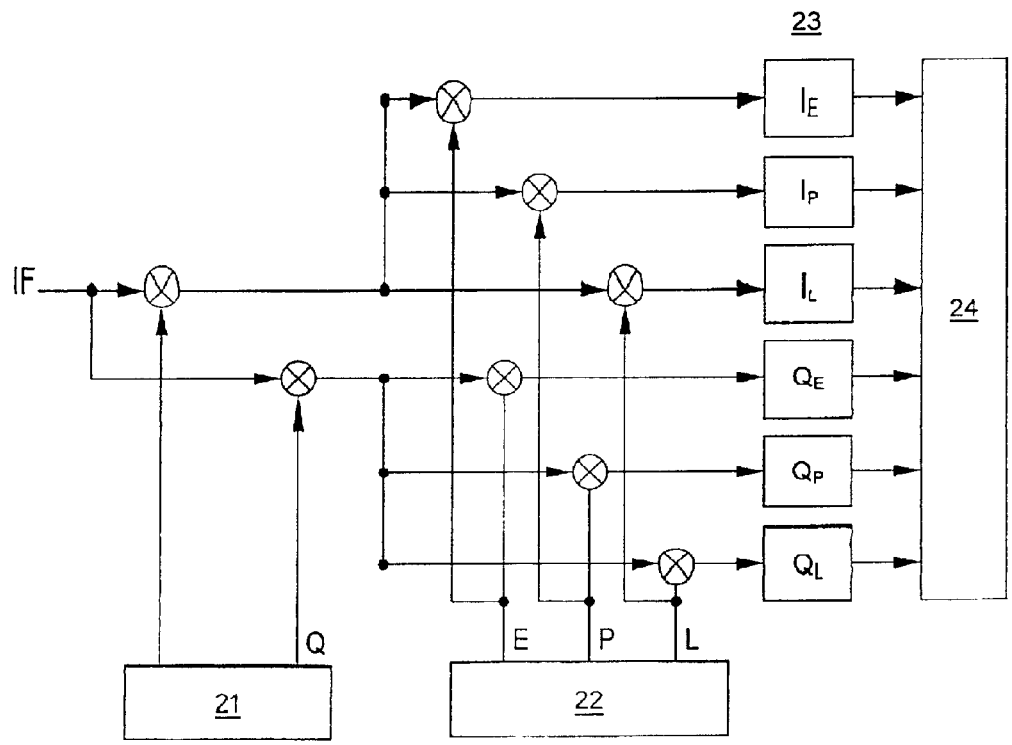
FIG. 2 shows, schematically, the receiver channels and receiver processor of the GPS receiver of FIG. 1 in greater detail.

FIG. 2 shows, schematically, the receiver channel co-operating with the receiver processor in greater detail. In order to retrieve the information on the incoming signal, a carrier wave (CW) must be removed and this is done by the receiver generating in-phase (I) and quadrature phase (Q) replica carrier wave signals using a carrier wave generator 21. The replica carrier waves ideally have the same frequency as the received signal, however, due to Doppler shift caused by the relative movement between the receiver and orbiting satellite, the frequency of the GPS signals as received in the receiver normally differs from the precise satellite transmission frequency. In order to accurately replicate the frequency of the received carrier wave, a conventional carrier wave phase lock loop is employed. Although perhaps undesirable, it is possible to omit the carrier phase lock stage altogether as the Doppler shift of the carrier and its associated effect on the code phase discriminator is reasonably small.

In order to acquire code phase lock, early (E), prompt (P) and late (L) replica codes of the PRN sequences are continuously generated by a code generator 22 at a frequency related to the received carrier (i.e. nominal plus Doppler). The replica codes are then correlated with the I and Q signals to produce three in-phase correlation components (IE, IL, IP) and three quadrature phase correlation components (QE, QL, QP), typically by integration in an integrator 23 over substantially the whole of the PRN code. In the receiver processor 13, a code phase discriminator is calculated as a function of the correlation components on which a threshold test is applied and a phase match declared if the code phase discriminator is high. If not, the code generator produces the next series of replicas with single chip phase advance and the code phase discriminator is recalculated. Any declared phase match is validated by recalculating the discriminator, A linear phase sweep will eventually result in the incoming PRN code being in phase with that of the locally generated replica and thus code acquisition.

Once the code is acquired, a code phase lock loop employing an early-minus-late correlation function is used to track the code. The early-minus-late correlation function is modified compared to the true early-minus-late correlation function because of the aforementioned filtering out of the first harmonics of the power spectrum of the incoming signal. As a consequence, the code phase lock loop provides an enhanced code phase error signal relating to the time difference between the incoming signal and the two local generated replicas.

Without wishing to be bound by any theory, the inventor believes the following analysis explains the relationship between the accuracy to which the code phase lock loop can determine the code phase error, the gradient of the early-minus-late correlation function at zero code phase error and the aforementioned power spectrum manipulation.

As previously stated, the accuracy to which the pseudo-ranges can be measured and ultimately to which the position of the GPS receiver can be estimated The relationship between the code phase error measurement ($\Delta t$) and an associated pseudorange error measurement ($\Delta D$) can be expressed as:

$$\Delta d \approx c\, \Delta t \qquad \text{[Equation 1]}$$

where C is the speed of light. Thus, if the accuracy of the pseudorange measurement is to be determined to 1 meter, the code loop error (after averaging for noise) must be to within 3.3 ns, or about $\frac{1}{300} T_c$ where $T_c$ is the GPS L1 C/A signal chip period.

Figure 3:
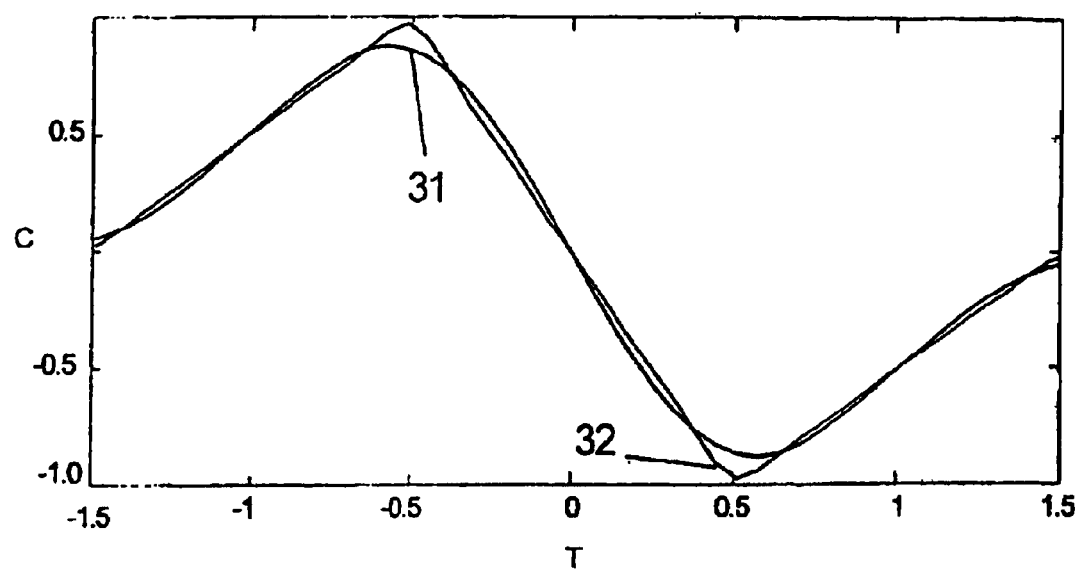
FIG. 3 is a graph showing an idealised early-minus-late correlation function for 1.0 MHz and 4.0 MHz bandwidths.

Curves 31 and 32 of FIG. 3 shows the true, normalised, early-minus-late (E–L) correlation function for signal bandwidths of 1.0 MHz and 4.0 MHz respectively where the E–L correlation is normalised by the prompt (P) correlation value. In a GPS receiver using early-minus-late code phase tracking, the code phase tracking error ($\Delta t$) can therefore be approximated whereby:

$$\Delta t = \frac{1}{g} \Delta \left\{ \frac{E - L \pm n_e + n_l}{P \pm n_p} \right\} \quad \text{[Equation 2]}$$

where g is the gradient of the (E–L)/P graph at t=0; E, L and P are correlation measurements; and $n_e$, $n_l$ and $n_p$ are early, late and prompt correlation measurement noise respectively.

Assuming the noise to be small and uncorrelated, at E–L=0, the code phase error Δt can be expressed as follows:

$$\Delta t \approx \frac{1}{g} \frac{\sqrt{2}\, n}{P} \quad \text{[Equation 3]}$$

where n is the magnitude of the effective noise.

It is therefore possible to define a figure of merit (FOM) which is approximately directly proportional to the receiver accuracy:

$$FOM = \left. \frac{d(E-L)}{dt} \right|_{t=0} \times n \quad \text{[Equation 4]}$$

A finite length pseudorandom noise code may be approximated to an ideal random binary code. Accordingly, there is no periodicity of the correlation and therefore no line quantisation of the correlation power spectrum.

The power spectrum of the correlation is given by the Fourier transform of the correlation power. Since there is no Fourier transform of a truly random binary code, in order to obtain the power spectrum, the Fourier transform of the autocorrelation function is calculated. For a binary code having an amplitude of ±A, the autocorrelation function is the classic triangular shape with a base length of ±1 code chip and a maximum correlation power of $A^2$. This can be expressed as follows:

$$R(\tau) = A^2 \left( 1 - \frac{|\tau|}{T_c} \right) \text{ for } |\tau| \leq T_c \quad \text{[Equation 5]}$$

$$R(\tau) = 0 \text{ for } |\tau| > T_c$$

where $T_c$ is the chip period for the C/A code). The Fourier transform of this is given by.

$$S(\omega) = A^2 T_c \sin c^2 \frac{\omega T c}{2} \quad \text{[Equation 6]}$$

As the correlation power can be derived from the inverse Fourier transform of the correlation power spectrum, it is therefore possible to use the power spectrum as a starting point for the derivation of the correlation function shape and size. Also, the power spectrum can be modified to reflect the consequences of any front-end filter characteristics and the Fourier transform taken of the resulting spectrum to derive the correlation characteristics. Although this does not take account of several significant effects, such as the low resolution ADC in an actual system, the qualitative results appear to be consistent with theorised models.

To do this, an idealised power spectrum is first generated over a range of frequencies (say ±8 MHz or ±12 MHz in 0.02 MHz steps) and held in a vector. The vector can then be "filtered" by multiplying individual elements by a transmission factor. The simplest form of filtering only uses filter transmissions of zero or one. The power spectrum is normalised to an amplitude, A, of unity.

The precise correlation can then be generated from the power spectrum by taking the inverse Fourier transform. This is a vector containing the correlation as a function of time, expressed in terms of the chip period $T_c$. The total length of the vector (i.e. the range of time) is inversely proportional to the frequency step size of the power spectrum and the correlation step size is inversely proportional to the total range of the power spectrum.

The early-minus-late correlation can be generated by a sparse matrix operation on the precise correlation vector.

$$EL(t) = M_{(E-L)} \cdot P(t)$$

where EL(t) is a column vector containing the (E–L) correlation result, P(t) is a column vector containing the precise correlation result and $M_{(E-L)}$ is a square matrix whose dimension is the same as the vector lengths. The matrix $M_{(E-L)}$ is mainly zero but contains elements of ±1 on diagonals which perform the (E–L) arithmetic operation. An example is shown below:

$$M_{(E-L)} = \begin{pmatrix} 0 & 0 & 1 & 0 & 0 & 0 & \cdots & 0 \\ 0 & 0 & 0 & 1 & 0 & 0 & \cdots & 0 \\ -1 & 0 & 0 & 0 & 1 & 0 & \cdots & 0 \\ 0 & -1 & 0 & 0 & 0 & 1 & \cdots & 0 \\ 0 & 0 & -1 & 0 & 0 & 0 & \cdots & 1 \\ 0 & 0 & 0 & -1 & 0 & 0 & \cdots & 0 \\ \vdots & \vdots & \vdots & \vdots & \vdots & \vdots & & \vdots \\ 0 & 0 & 0 & 0 & -1 & 0 & \cdots & 0 \end{pmatrix} \quad \text{[Equation 7]}$$

The distance of the leading element of each diagonal from the top-left corner of the matrix gives the early-minus-late spacing and will depend on the time resolution of the correlation vector.

Figure 4:
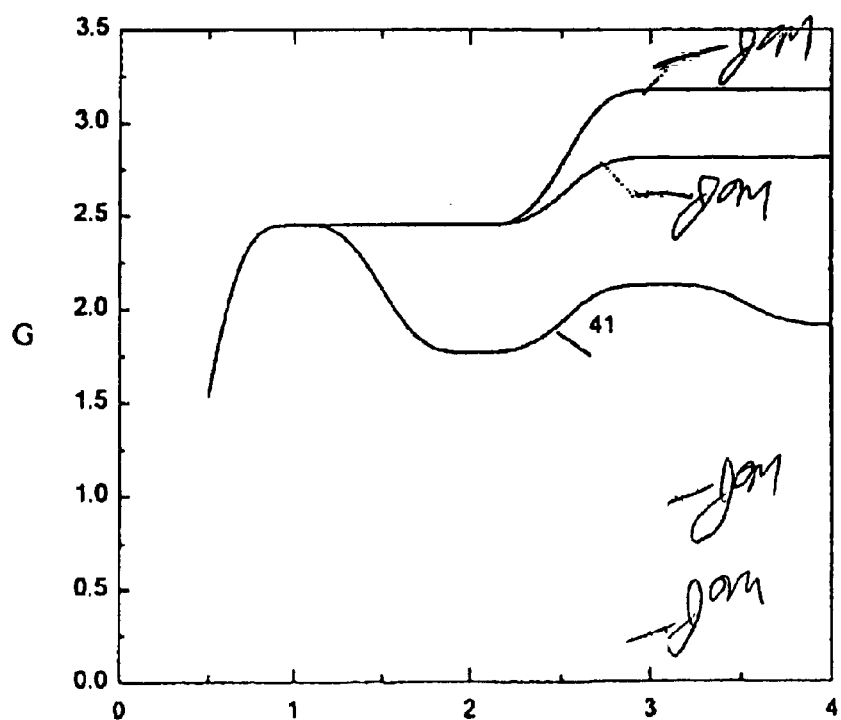
FIG. 4 is a graph showing the gradient of the early-minus-late correlation function plotted against the bandwidth of the incoming signal for both unmodified and modified incoming signals.
Figure 5A:
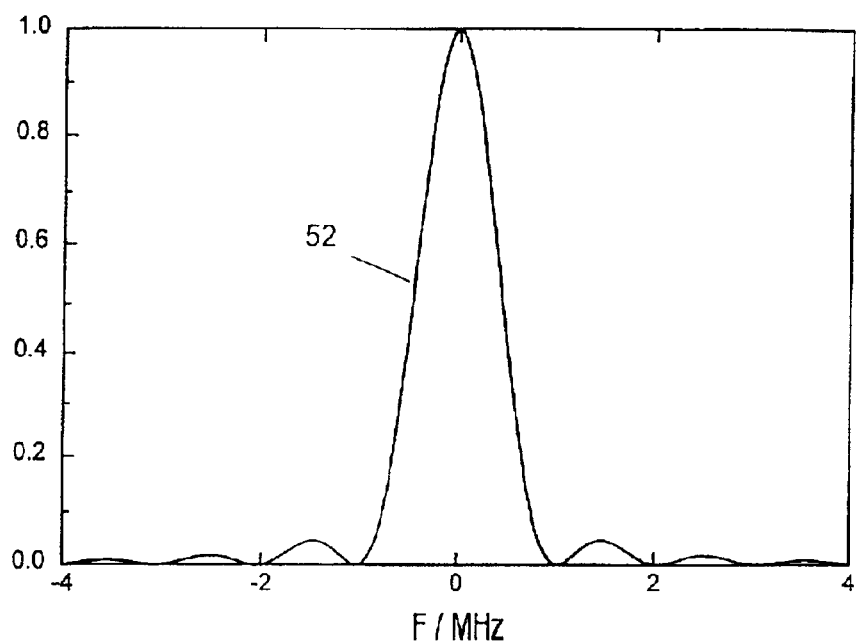
FIGS. 5A and 5B are graphs showing normalised power spectrums for both an unmodified and a modified incoming signal respectively.

In FIG. 4, curve 41 shows the FOM, i.e. the gradient of the early-minus-late correlation function, varying with the half-bandwidth of incoming signal. This is due to the shape of the correlation peak being modified by the varying sum of its Fourier components. The reason for the variation in FOM with bandwidth is further explained by the power spectrum of the correlation described by curve 51 in FIG. 5A. The power spectrum has nulls at 1, 2 , 3 . . . n MHz. Between 0 and 1 MHz, even Fourier components contribute to the power, between 1 and 2 MHz odd Fourier components contribute to the power (etc.). These even and odd components eventually mix to form the ideal triangular correlation shape. However, even components serve to increase the steepness of the correlation shape around t=Tc/2 while odd components serve to decrease the steepness. For half-chip (E–L) correlators, an increase in the steepness of the correlation shape at Tc/2 results in an increased (E–L) gradient at t–0 and therefore an improved FOM.

Figure 5B:
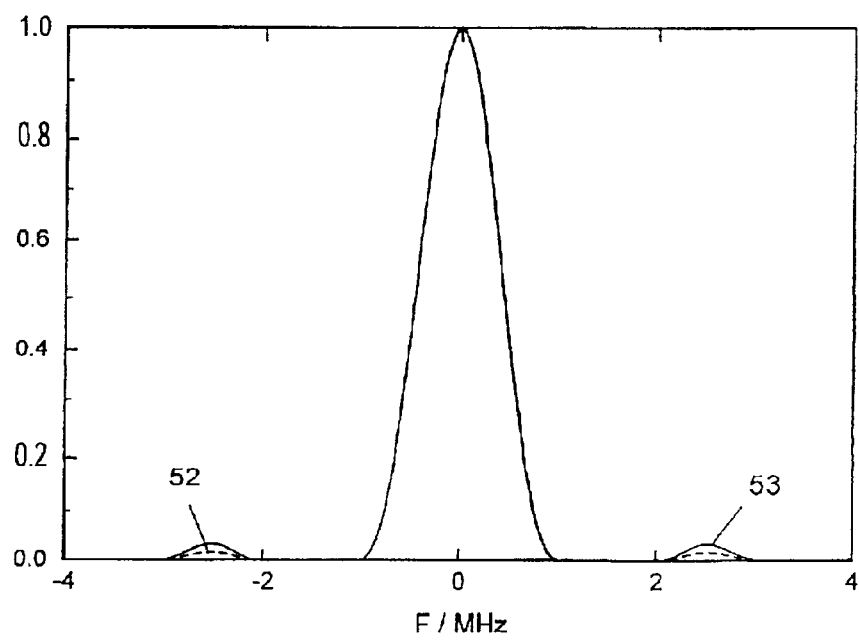

The idea behind this invention is to selectively allow the even components of the signals to contribute to the correlation while blocking the odd components. In practice, to limit the required bandwidth, only the first few components would be used. The resulting modified power spectrum is described by curve 52 in FIG. 5B, suggesting that the FOM can be increased by about 14% in this way.

Even greater increases in the FOM can be achieved by artificially adapting the shape of the correlation. Curve 53 of FIG. 5B described the situation where the odd components have been removed and the first harmonic even components increased by a factor of 2. The FOM is now increased by a factor of about 28%. Thus, this invention provides a method of increasing the accuracy of a GPS system which uses code tracking only.

As previously stated, in a GPS receiver of the type shown schematically in FIGS. 1 and 2, the preprocessing, receiver channel and receiver processor will typically be implemented in the form of front end analogue circuitry combined with either a general purpose microprocessor or a microprocessor embedded in a GPS application specific integrated circuit. Implementation of a method of code phase tracking according to the present invention, including the example as described below, may be accomplished by appropriate analogue circuitry design and/or microprocessor programming. Of course, such design and programming is well known and would be accomplished by one of ordinary skill in the art of GPS and CDMA communication without undue burden.

What is claimed is:

1. A method of code phase tracking comprising the steps of:

(a) receiving a subject signal containing a target pseudorandom noise code;

(b) generating a series of signals containing early and late replica codes corresponding to the target code;

(c) correlating the subject signal with the early and late replica code signals and returning respective early and late correlation values; and (d) determining the code phase error between the target code and the replica codes from a modified early-minus-late correlation function derived from the early and late correlation values, the modified early-minus-late correlation function being such that its gradient at zero code phase error is increased compared to the true early-minus-late correlation function.

2. A method according to claim 1 wherein the early-minus-late correlation function is modified by modifying either the subject signal, the early and late replica code signals or the early and late correlation values prior to deriving the early-minus-late correlation function.

3. A method according to claim 2 wherein at least one odd harmonic of the power spectrum of the subject signal is reduced in size or removed.

4. A method according to claim 2 wherein at least one even harmonic of the power spectrum of the subject signal is increased in size.

5. A method according to claim 2 wherein the bandwidth of the power spectrum of the subject signal is truncated between harmonics so as to excise an adjacent even harmonic.

6. A method according to claim 2 wherein at least one odd harmonic of the power spectrum at least one of the early and late replica code signals is reduced in size or removed.

7. A method according to claim 2 wherein at least one even harmonic of the power spectrum at least one of the early and late replica code signals is increased in size.

8. A method according to claim 2 wherein the bandwidth of the power spectrum at least one of the early and late replica code signals is truncated between harmonics so as to excise an adjacent even harmonic.

9. A receiver comprising:

an antenna for receiving a subject signal containing a target pseudorandom noise code; and a signal processor for implementing a method of code phase correlation comprising the steps of:

(a) receiving a subject containing a target pseudorandom noise code;

(b) generating a series of signals containing early and late replica codes corresponding to the target code;

(c) correlating the subject signal with the early and late replica code signals and returning respective early and late correlation values; and (d) determining the code phase error between the target code and the replica codes from a modified early-minus-late correlation function derived from the early and late correlation values, the modified early-minus-late correlation function being such that its gradient at zero code phase error is increased compared to the true early-minus-late correlation function.

10. A receiver comprising:

an antenna for receiving a subject signal containing a target pseudorandom noise code; and a signal processor, the signal processor comprising:

a generator for generating a series of signals containing early and late replica codes corresponding to the target code, a correlator for correlating the subject signal with the early and late replica code signals and returning respective early and late correlation values, and means for determining the code phase error between the target code and the replica codes from a modified early-minus-late correlation function derived from the early and late correlation values, such that the gradient of the modified early-minus-late correlation function at zero code phase error is increased compared to the true early-minus-late correlation function.

11. A receiver according to claim 10 wherein the early-minus-late correlation function is modified by modifying either the subject signal, the early and late replica code signals or the early and late correlation values prior to deriving the early-minus-late correlation function.

12. A receiver according to claim 11 wherein at least one odd harmonic of the power spectrum of the subject signal is reduced in size or removed.

13. A receiver according to claim 11 wherein at least one even harmonic of the power spectrum of the subject signal is increased in size.

14. A receiver according to claim 11 wherein the bandwidth of the power spectrum of the subject signal is truncated between harmonics so as to excise an adjacent even harmonic.

15. A receiver according to claim 11 wherein at least one odd harmonic of the power spectrum at least one of the early and late replica code signals is reduced in size or removed.

16. A receiver according to claim 11 wherein at least one even harmonic of the power spectrum at least one of the early and late replica code signals is increased in size.

17. A receiver according to claim 11 wherein the bandwidth of the power spectrum at least one of the early and late replica code signals is truncated between harmonics so as to excise an adjacent even harmonic.

* * * * *